Figure 3A:
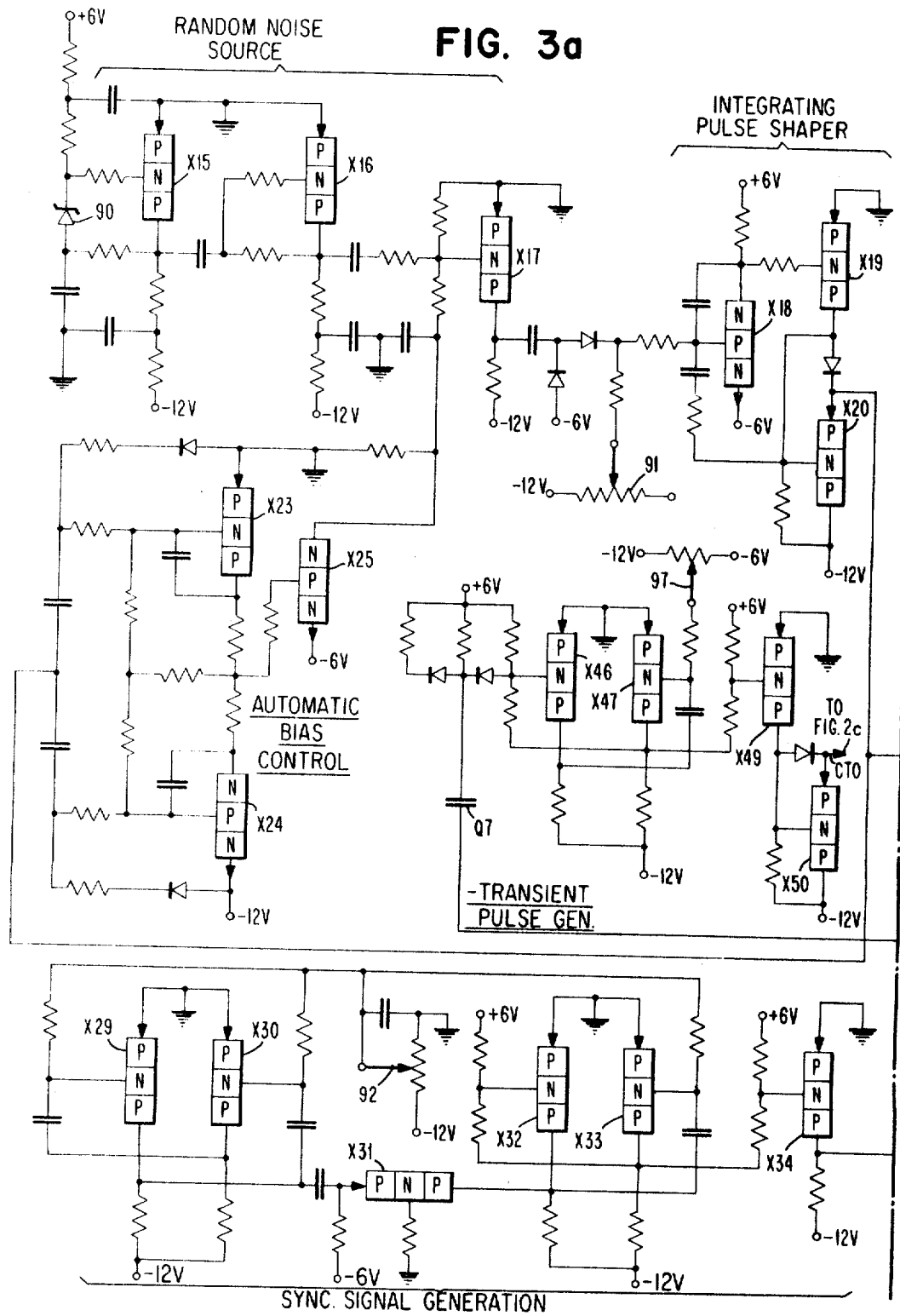
Figure 3B:
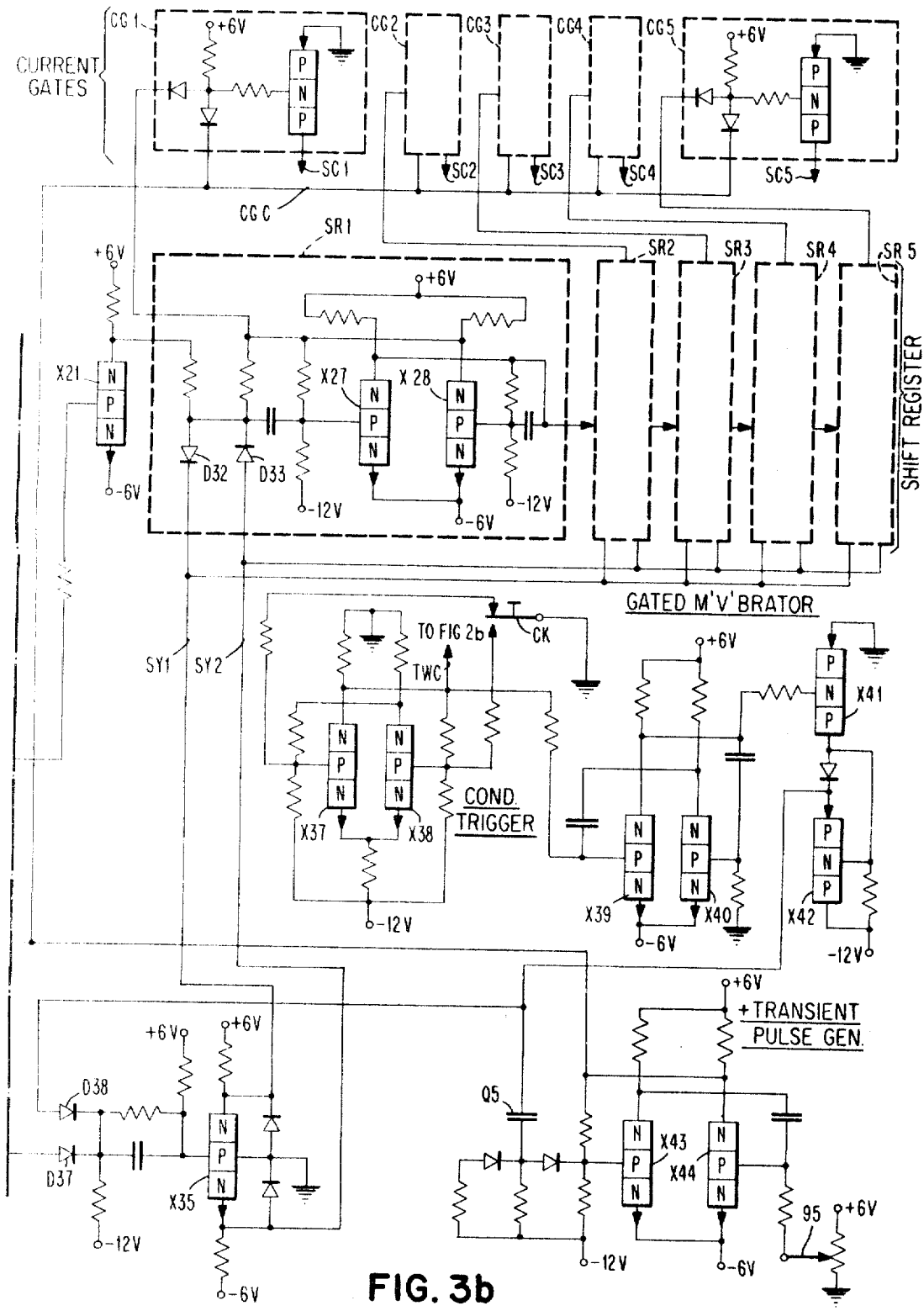

RANDOM SELECTION SIGNALS
FROM STATISTICAL CONDITIONING CIRCUITS, FIG. 3b

United States Patent Office 3,317,901
Patented May 2, 1967

3,317,901
ADAPTIVE LOGIC SYSTEM WITH INPUTS APPLIED RANDOMLY ONLY DURING CONDITIONING CYCLES
Genung L. Clapper, Vestal, N.Y., assignor to International Business Machines Corporation, New York, N.Y., a corporation of New York
Filed Feb. 5, 1964, Ser. No. 342,745
8 Claims. (Cl. 340—172.5)

This invention relates to adaptive logic systems and particularly to an improved adaptive logic system in which the adaptive memory units in the system are supplied with information on a statistical basis only during the learning or conditioning cycle of the system.

In a co-pending application Ser. No. 331,832, filed Dec. 19, 1963, now Patent No. 3,284,780, and assigned to the common assignee, there is disclosed and claimed an adaptive logic system utilizing a plurality of metastable adaptive memory units having a neutral or null condition and a plurality of stable conditions on each side of the neutral condition. Displacement or conditioning causes the adaptive memory unit to supply, on an associated set of output lines common to a plurality of the memory units, voltages which indicate the degree to which the memory unit has been conditioned from one side or the other of its neutral state. Equal outputs indicate that the unit is in its neutral or null condition.

All of the active outputs from a bank of memory units common to a particular input condition are summed and supplied via the pair of common output lines to a balance decision unit which is arranged and constructed in such manner that it provides a ternary output indicative of a balance of outputs on two weighted output lines; that is, both outputs will be provided if both of the weighted output lines are equal in their weight; that is, the voltage thereon is equal. If the output lines are not balanced, the balance decision unit will so indicate the direction of unbalance.

To accelerate the learning process, it has been found that randomizing the application of the inputs to the memory banks will enhance the learning condition, thereby shortening the time required for training the system to the responses desired.

Accordingly, a prime object of this invention is to provide an improved adaptive logic system in which the inputs to the adaptive memory units are randomized to enhance the learning or conditioning operation.

Another object of the invention is to provide an adaptive logic system in which inputs to the adaptive memory units are rendered ineffective on a random or statistical basis during the conditioning cycle of the system, but all inputs are effective at times other than the learning cycle.

Still another object of the invention is to provide an adaptive logic system of the type described in which the input circuits to the adaptive memory units are selectively disabled on a random basis during the conditioning operation.

Another object of the invention is to provide an adaptive logic system of the type described in which the randomizing of the inputs is provided by use of a random number generator which maintains a relatively constant duty cycle when averaged over a long time of operation.

Briefly described, the subject system comprises a plurality of adaptive memory units, banks of which are arranged to receive input signals from a plurality of input signal lines, there being one memory unit in each bank for each of the input lines. A gate circuit is provided in each input line, and these gates are grouped in accordance with the division of the inputs into selected combinations of input signals. All of the gates in each group are provided with a common control whereby the input signals to the adaptive memory units from any group may be selectively inhibited. The inhibiting of the gating signals is accomplished on a random basis, during the conditioning cycle of the system, by controlling the gates with control signals standing in a shift register, these signals being furnished by a random number generator. The particular random number generator used in this invention provides a relatively constant average ratio of "ones" to "zeros" in the shift register when averaged over a relatively long time period compared to the unit pulse length.

The foregoing and other objects, features and advantages of the invention will be apparent from the following more particular description of preferred embodiments of the invention, as illustrated in the accompanying drawings.

Figure 1:
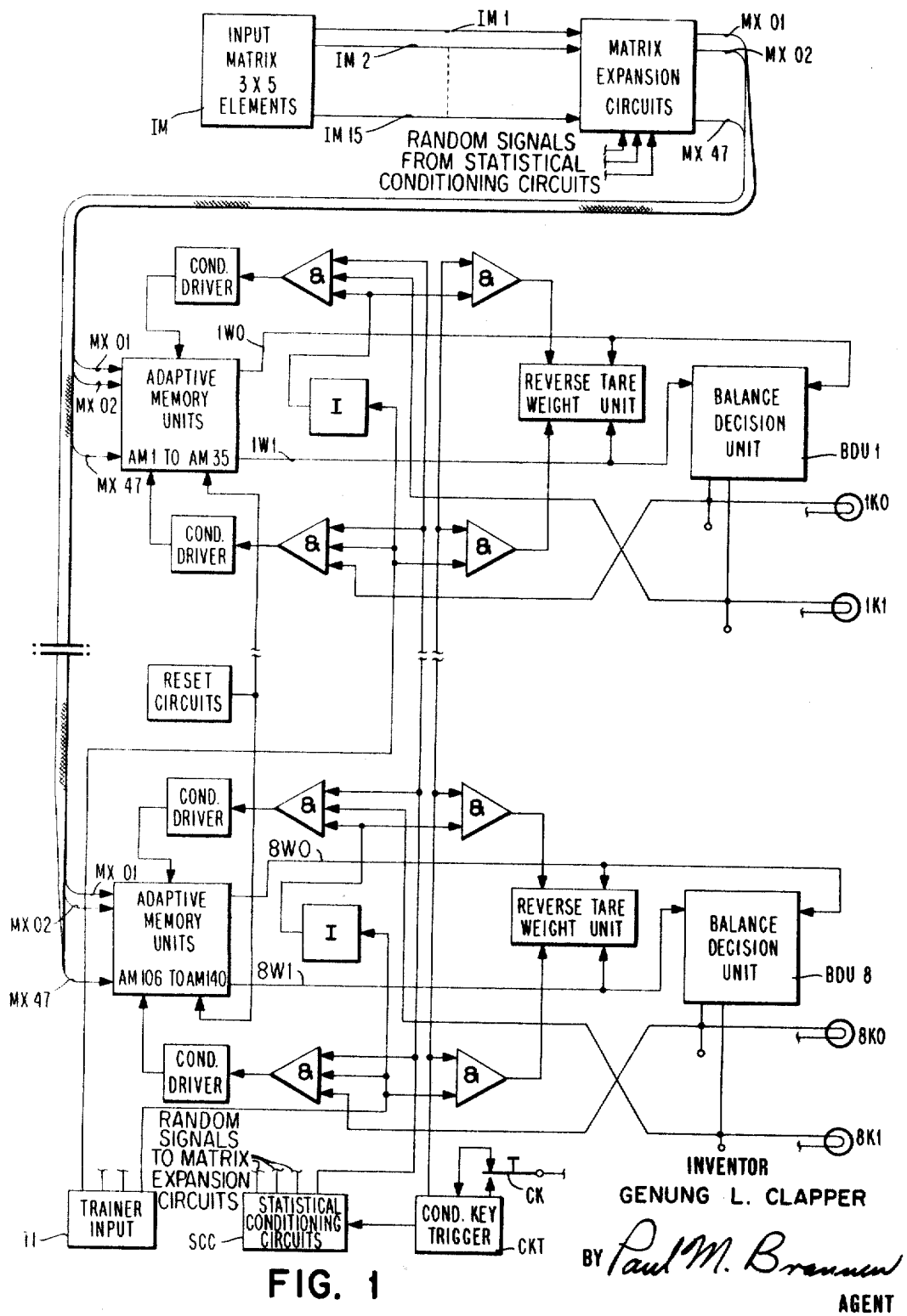

In the drawings:

FIG. 1 is a diagrammatic view showing the entire system in a simplified fashion.

Figure 2A:
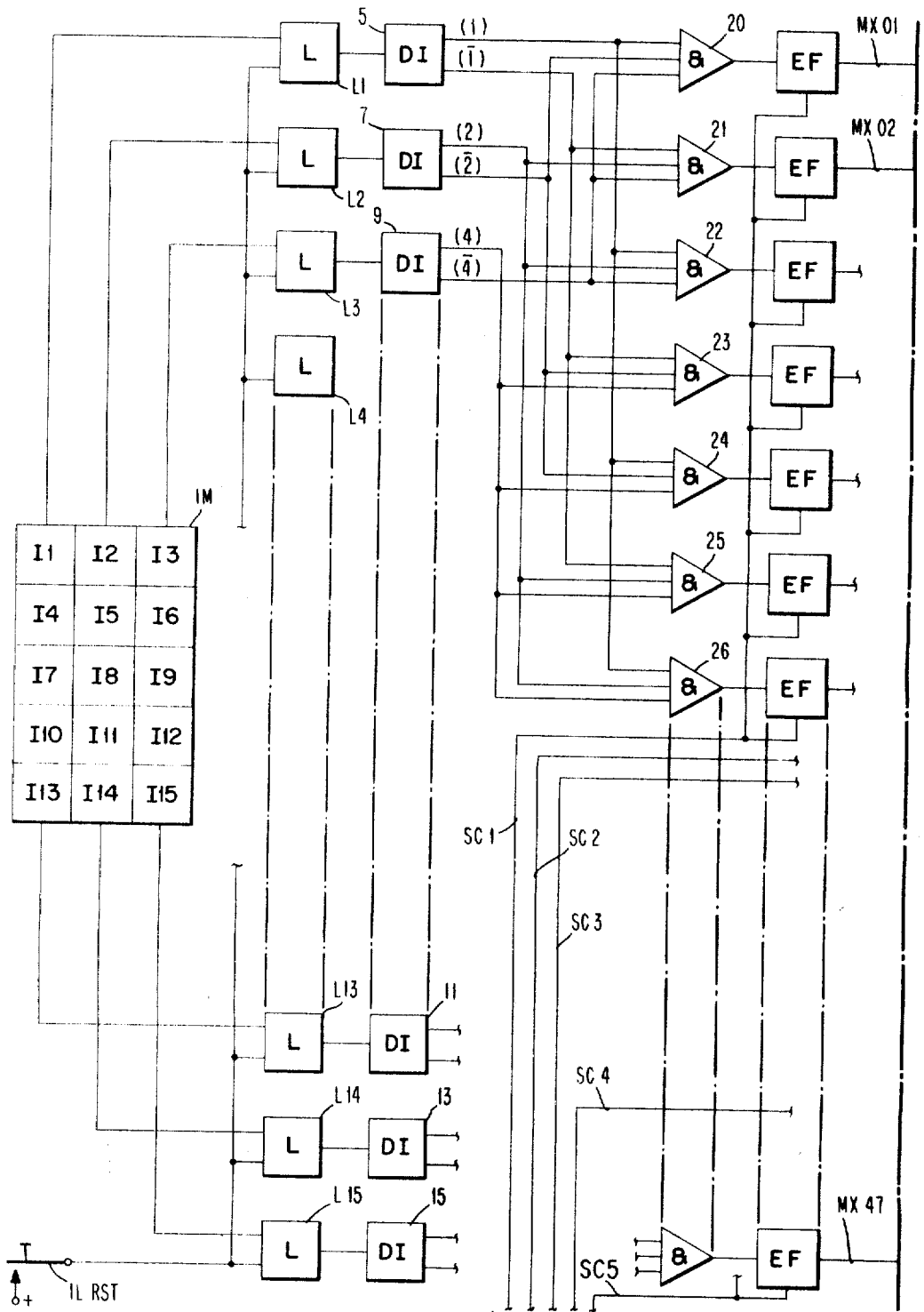
Figure 2B:
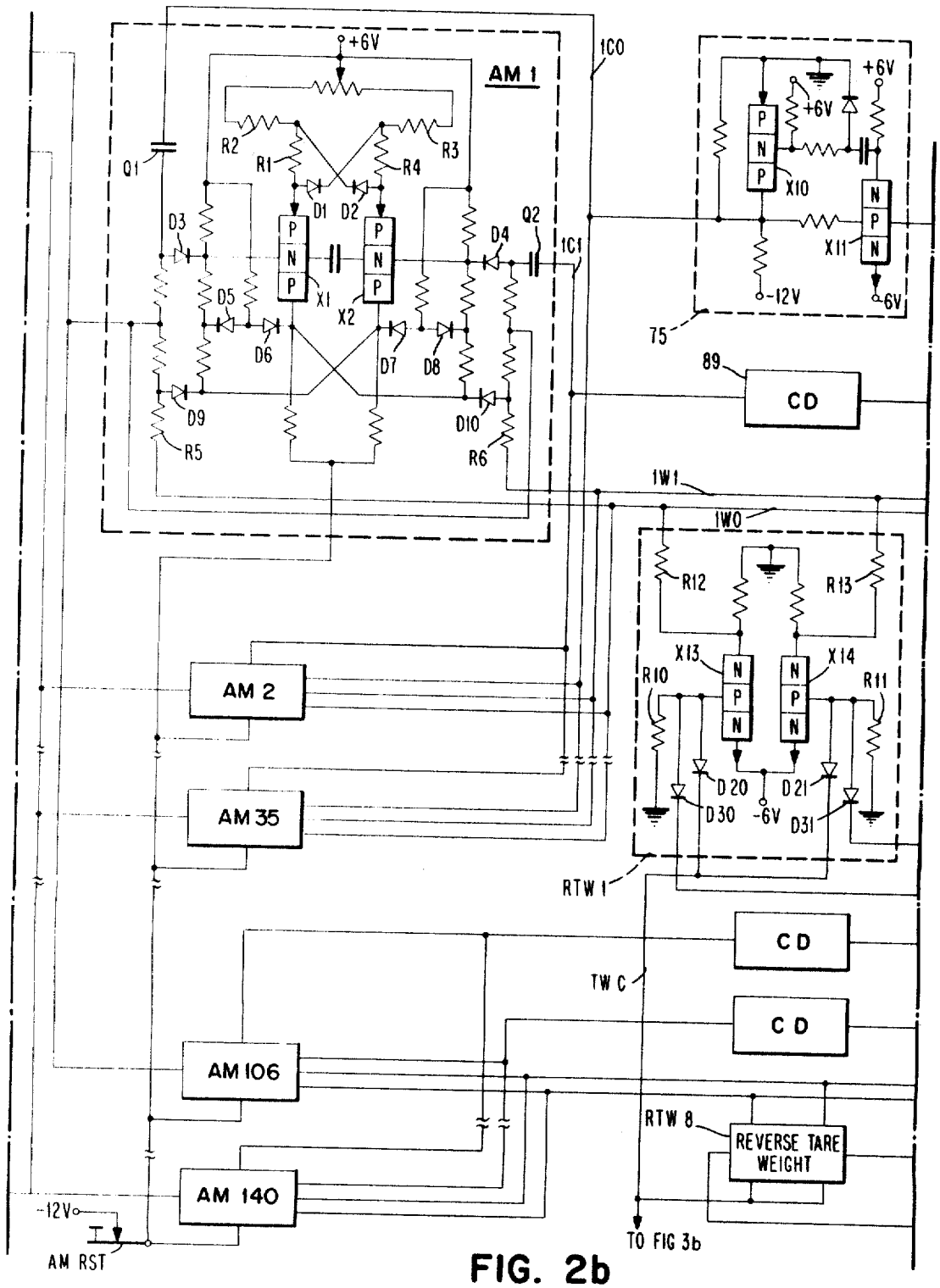
Figure 2C:
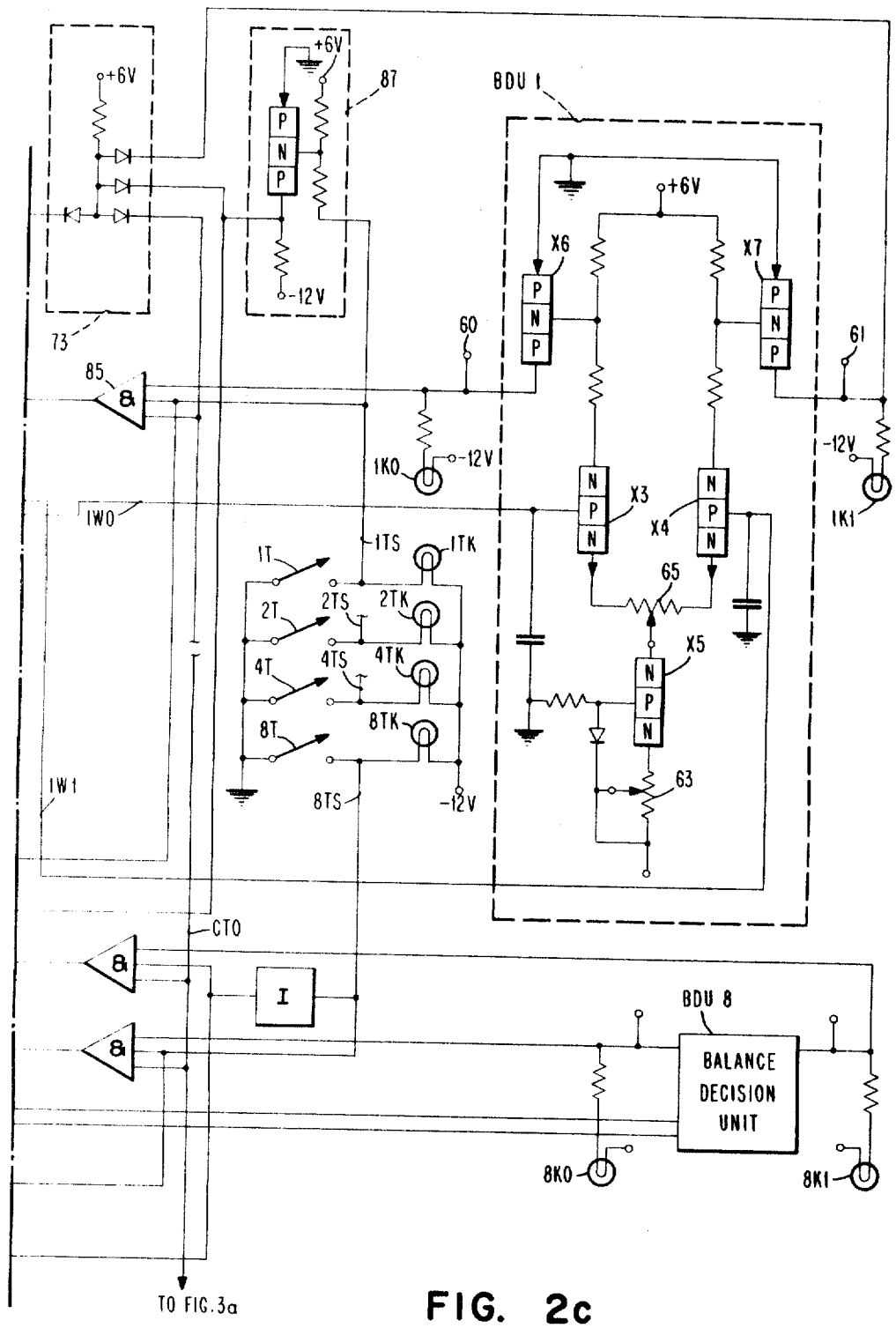

FIGS. 2a, 2b and 2c, placed side by side in the order named, are diagrammatic views in more detail of an adaptive logic system employing a preferred embodiment of the invention.

FIGS. 3a and 3b, placed side by side, show in diagrammatic form the detail of circuits which may be utilized with the system shown in FIGS. 1 and 2, to provide the statistical conditioning control.

Referring to the general view shown in FIG. 1 of the drawings, the input to the system is derived from an input matrix IM which may have, for example, 15 elements arranged in rows of three and columns of five, from which 15 output lines, such as the lines IM1, IM2 through IM15 are supplied, these lines having signals thereon when the associated one of the elements in the input matrix is active. These input lines are connected to the matrix expansion circuits, to be later described, in which output signals are derived for the various combinations of inputs supplied thereto. These expanded or transformed outputs are designated by coded numbers, three of which are indicated as MX01, MX02 and MX47. Conditioning control signals are supplied to the matrix expansion circuits to selectively control the outputs of the matrix expansion circuits.

The expanded outputs are supplied in parallel to a plurality of banks of adaptive memory units, only two such banks being shown in FIG. 1, the remainder being arranged in identical fashion. One such bank of adaptive memory units is provided for each output condition which is to be indicated and each of the banks contains a number of adaptive memory units equal to the number of inputs supplied thereto from the matrix expansion circuits. For example, the first bank of adaptive memory units contains adaptive memory units AM1 through AM35. The intervening two banks of adaptive memory units for the second and fourth orders of binary output are not shown, but the last bank, which would be for the binary output order of 8, will contain the adaptive memory units AM106 to AM140. As can be seen from the drawings, the inputs are supplied in parallel to each of these banks of memory units. Each memory unit in the bank is of a type which will be described in detail later; suffice it to say for the present that the memory unit, upon a supply thereto of suitable input and conditioning pulses, will provide an output on one or the other or both of a pair of output lines, depending upon whether or not the conditioning signals supplied to the memory units are such as to cause the memory unit to be displaced from one side or the other of a neutral condition.

The outputs from each of the adaptive memory units are supplied to a set of common output lines associated with the particular memory bank, such as the lines 1W1 and 1W0, associated with the first memory bank, and lines 8W1 and 8W0, associated with the last memory bank.

The voltages on these output lines will be balanced or equal or will be unbalanced in accordance with the condition of the input-activated memory units in the memory banks to which they are connected. Thus, the condition of the adaptive memory units is reflected in the balanced or unbalanced condition of the output signal lines whenever an input pattern is presented.

The outputs on the common output lines are supplied to a balance decision unit, one for each memory bank, such as the units BDU1 and BDU8. These balance decision units are sensitive voltage comparison devices, which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to the output terminal associated with the indicator lamp 1K0, and also lights lamp 1K0, indicating that the zero condition is present for the output of the first memory bank. Conversely, if line 1W1 has a higher voltage than 1W0, the indication lamp 1K1 will be lighted. In the event that the lines are balanced, or nearly so, within the tolerance of the balance decision unit, outputs will be present on both outputs from the balance decision unit and, therefore, both output indicator lamps 1K0 and 1K1 will be illuminated. Additional terminals are provided as shown, which may be supplied to further units, not shown, including decoding and utilization devices for utilizing the information supplied from the adaptive memory system. Since the ultimate use of the information stored by the system is not germane to the structure and operation of the system itself, these further details have not been shown.

In order to condition the adaptive memory units, signals from a trainer input are supplied both in normal and inverted form to the adaptive memory via associated AND circuits and condition drivers as shown. In addition to the trainer inputs, the AND circuits are supplied with an input from the opposing output line of the balance decision unit as well as an input from statistical conditioning cricuits SCC which are governed in part by a conditioning key trigger CKT and key CK. In operation, the trainer inputs are set for the desired output with a given input and, if the balance decision unit does not put out a signal of the suitable value, the output line from the balance decision unit combines with the inputs from the trainer and the statistical conditioning circuits. The condition driver, which is adapted to drive all of the memory units, serves to further condition the adaptive memory units which have inputs supplied thereto to increase or decrease their weight as necessary. The inputs which are to be effective are determined on a random basis at this time by the statistical conditioning circuits. After the adaptive memory units have been suitably trained, it is then possible to prevent various input combinations, thereto and have the adaptive memory units supply appropriate outputs to the output circuits that cause the desired output to be produced.

Additionally, the signals from the trainer input and the condition key trigger are supplied via suitable AND circuits to the inputs of an auxiliary weighting unit, here designated as a "reverse tare weight unit." One such reverse tare weight unit is provide for each of the memory banks, but, as with the remainder of the system, only the two units associated with the banks 1 and 8 are shown herein. The reverse tare weight units are constructed and arranged in such manner so that, when a signal is supplied thereto as a result of the coincidence of an input signal or its inverse from the trainer input and the output of the condition key trigger, one side or the other of the reverse tare weight unit will be activated and will operate in such manner as to subtract a predetermined amount of potential existing on the output lines from the adaptive memory units, such as the lines 1W0 and 1W1. This reverse or negative tare weight is effective during the conditioning operation to tip the weight or the balance on the output lines from the adaptive memory units in the opposite direction from that which is desired. That is, more weight must then be accumulated in order to overcome the reverse tare weight. The result of an addition of such reverse tare weight is that the adaptive recognition "learns" faster and the sums which are accumulated are larger. This increases the distance or values between weights of opposite sides since the reverse tare is only effective during conditioning and is removed when the conditioning ceases.

Referring now to the detailed drawings, particularly FIGS. 2a, 2b and 2c, taken together, the input to the system is considered to be derived from a plurality of input devices which may be arranged in matrix fashion, designated by the reference character IM, denoting input matrix. The matrix shown is a 3-by-5 matrix; i.e., there are three elements per row and five rows. However, it is to be understood that any number of rows and columns could be utilized. Each of the input elements is distinctively labeled as shown, I1, I2, I3, I4, etc. These elements may be, for example, photocells arranged in a matrix for detecting a pattern projected thereon. The outputs from each input element in the matrix IM; i.e., the elements I1 through I15, inclusive, are supplied as inputs to latch or trigger storage circuits indicated by the rectangles designated with the letter L and with the reference characters L1 through L15, only seven of which are shown. These latches are of conventional construction and arranged in such manner that an input thereto from the associated input element of the input matrix will cause the latch to be set ON and the latch will remain in its ON condition unless and until the input latch reset button ILRST is depressed, at which time energy is supplied to the reset circuits of all of the latches to restore them to their normal or OFF condition. The input latches L1 through L15, accordingly, serve as an input storage medium which provides input information to the subsequent circuitry. It should be noted that, if the input from the matrix is persistent, the latches can be eliminated.

Each of the input latches L1 through L15 have associated therewith a double inverter such as the ones indicated by the rectangles with the designation DI, reference characters 5, 7, 9, 11, 13 and 15, which constitute six out of the total of fifteen which would be provided in the arrangement shown. Each of the double inverters is arranged in a conventional manner to provide a normal and inverted output on the two output lines associated therewith. For example, the output lines associated with the double inverter 5 are designated by the reference characters (1) and ($\overline{1}$), indicating respectively an output line on which the value 1 is indicated and another output line in which the value of 1 is indicated. When no signal is supplied to the double inverter from the associated latch, the negative output line is energized and, when a signal is supplied from the latch, the positive output line is energized. Similar outputs are provided on each of the fifteen inverters. In accordance with binary coding notation, the first three inverters 5, 7 and 9 have the output lines 1, 2 and 4 and their negatives provided therefrom.

The double inverters provide outputs which are combined in a plurality of AND circuits to provide in the present case seven expanded input or transformed input signals for each three element matrix row. Since each row of the matrix is expanded in similar fashion, only the detailed arrangement for expansion of the first row will be considered. As shown, there are seven AND circuits 20 through 26 provided, each having three inputs thereto and having a single output which is energized when and only when a signal is provided at each of the three inputs to the particular AND circuit. These AND circuits are connected so that they represent all of the possible combinations of outputs from the double inverters 5, 7 and 9 except the null combination; that is, the combination which exists when all of the negative output lines of the three inverters are energized, this corresponding to a condition in which none of the inputs in the input matrix have been energized. For instance, an AND circuit 20 provides an output when there has been an input combination constituting a 1 and $\overline{2}$ and $\overline{4}$ condition for the first row, so that a prefix 0 would be used. This indicates an input to the first element of the first row, but no input to the second and third element of the first row.

The outputs from the AND circuits 20 through 26 are supplied through suitable emitter followers as designated by the rectangles enclosing the reference characters EF, these being provided with a suitable gating input common to all of the emitter followers for a particular row. These gating or control lines are governed by signals supplied from the statistical conditioning circuits, which will be subsequently explained. Thirty-five of the emitter followers EF are provided in the system, for each of the possible matrix expansion outputs from the matrix expansion circuitry. These emitter followers are divided into five groups of seven each, each group being controlled by a separate line from the statistical conditioning circuits. The control lines are designated by the reference characters SC1 through SC5, and the circuits are arranged so that the signals supplied from the associated AND circuits are supplied to the emitter follower outputs only when the associated control line is at ground potential, and the signals from the emitter followers are inhibited or blocked when the control lines are at some negative potential; e.g., −12 volts. The outputs of the emitter followers are designated by the reference character MX followed by a code designation indicating, first, the row and, second, the binary number designation for that particular line. Only three examples of these outputs are shown, MX01, MX02 and MX47, which are respectively the binary one output from the zero row or topmost row of the matrix, the binary two output from the zero or topmost row of the matrix and the binary seven output from the fourth or lowermost row in the matrix, the rows being numbered consecutively 0, 1, 2, 3, 4, from top to bottom.

A single transformed output is produced for the expansion of active elements in each row of the matrix. Thus, five out of thirty-five output lines will be active for input patterns having elements in five rows of the input matrix.

The 35 output lines from the matrix expansion circuits are carried in multiple to each one of a plurality of banks of adaptive memory units, each bank having 35 units therein corresponding to the 35 matrix expansion lines. The number of banks is determined by the number of binary outputs by which it is desired to indicate the output conditions for a given set of input conditions supplied to the input matrix. In the present instance it will be assumed that four banks of adaptive memory units of 35 units each will be utilized to provide binary outputs which, in binary coded fashion, namely 1, 2, 4 and 8, can supply a total output considered decimally zero to fifteen. Thus, there will be a total of 140 adaptive memory units, only one of which will be described in detail since the structure of all are similar.

As shown in FIG. 2b, the adaptive memory unit AM1 includes the apparatus shown in detail in the dotted rectangle designated AM1. These units are also disclosed and claimed in a co-pending application Ser. No. 334,397, filed Dec. 30, 1963, now Patent No. 3,286,103, and assigned to the common assignee.

Each of the memory units includes a pair of PNP transistors, such as X1 and X2, together with a plurality of diodes such as the diodes D1 through D10, and resistive and capacitive elements which, in combination, form a metastable storage device having a neutral or reset state and having a plurality of settable conditions in either direction from the neutral state. In the present instance, there are two stable states on either side of the neutral state so that in effect, an adaptive memory device in the present arrangement has five stable states. Each of the memory units, such as AM1 has an activating input which is supplied from the matrix expansion circuits, such as the line MX01. All other lines from the matrix expansion circuits are connected to the adaptive memory units in that particular memory bank. The input signals from the matrix expansion circuits combine with conditioning pulses applied to the 5-state trigger to move it from one state to another and also control the application of the weighted outputs to the output lines. The diodes D3 and D4 are associated with the pair of gates controlling the conditioning in the arrangement shown and diodes D9 and D10 are associated with the gates controlling the summation of the weights on the output lines. The central part of the circuit is a 5-state trigger which is basically an Eccles-Jordan flip-flop modified to have three additional stable states by the use of diode pairs D1, D2; D5, D6; and D7, D8.

When power is supplied to the circuit, or following a resetting operation which is provided by operation of the reset key AMRST, the diodes D1 and D2, which are cross-connected in the emitter circuits of the transistors X1 and X2, provide a stable mode at a midpoint or a neutral state for the trigger. At this time equal collector current flows in X1 and X2 and the voltage level at the collectors is equal at some predetermined potential, say, for example at −4 volts. The emitters of X1 and X2 are also at equal voltage levels and the emitter impedance taps are at a higher level; that is, the intermediate taps between the resistors such as R1, R2 and R3, R4. Thus, D1 and D2 are both reverse biased. The emitter impedances are therefore not connected in parallel and, since the emitter impedance is greater than the collector impedance, the effective gain of each stage, that is, either side of the trigger, is less than unity. Thus, the circuit is stable at this point and the net weight applied to the balanced output lines from the unit will be considered to be zero since equal current flows in the resistors R5 and R6, which are connected to the common summation output lines for all of the memory units in the bank and which are designated by the reference characters 1W0 and 1W1.

A conditioning pulse on the common conditioning line for zero conditioning for the first bank, namely, 1C0, supplied along with an input on the line MX01, will cause a positive transient to be supplied to the base of transistor X1 via capacitor Q1 and diode D3. This reduces the collector current of X1 and causes the collector voltage to start dropping towards some negative value, such as −12 volts, to which the collectors are returned. At the same time the emitter of transistor X1 starts rising towards +6 volts and the diode D1 will conduct. Increased current flowing in transistor X2 causes the collector voltage to rise until it is equal to the voltage at the divider tap in the impedance from the collector of transistor X1 to the base of X2, at which time the diodes D7 and D8 will conduct equally. With both diodes D7 and D8 conducting, a low impedance inverse feedback path is established from the collector of transistor X2 to the base thereof which stabilizes the trigger at a first stable condition on one side of the neutral point, where the voltage may be, for example, −6 volts at the collector of transistor X1 and −3 volts at the collector of transistor X2 with a difference therebetween of −3 volts. This might be indicated as the −1 weight condition. This condition is indicated on the summation lines because the current flowing to the summation line 1W0 is now greater than that flowing to the 1W1 line since the collector of transistor X2 is more positive than the collector of transistor X1. Another pulse on the condition zero line for the first memory bank; namely, 1C0, still in the presence of an input gate, would reduce the current in X1 still further. The collector of transistor X1 would drop to its lowest level, say for example, −10 volts, as transistor X1 approaches cutoff and X2 approaches saturation, raising its collector voltage to some value such as −1 volt. The trigger is now stable in a second condition on one side of the neutral point which might be designated as a −2 weight and, therefore, the current supplied to the 1W0 line is now a maximum of −2 units.

The state of the trigger can now be changed to add increasing weight to the summation output line 1W1 by applying pulses to the condition 1 input line 1C1 at the time that a signal is present on the common input to the two sides of the trigger on line MX01. These inputs will be supplied to the base of transistor X2 via capacitor Q2 and diode D4 and the first pulse will move the trigger from the −2 weight condition to the −1 weight condition where diodes D7 and D8 would again stabilize the circuit. A second pulse on the line 1C1 will bring the trigger to its neutral state as originally described. A third pulse would bring the diode pair D5 and D6 into action and, as a result, the trigger will be set to a condition where the collector voltage for X1 will be at approximately −3 volts, whereas the collector voltage for the X2 will be at −6 volts. The difference between the voltage of the collector of X1 and the collector of X2 will be +3 volts and this may be designated as the +1 weight condition. A fourth pulse will cause the transistor X2 to approach cutoff and transistor X1 to approach saturation. which would then stabilize the trigger in a state where the collector voltage of X1 is approximately −1 and that for the collector of X2 is approximately −10, which may be considered a +2 weight for the trigger. Thus, the adaptive memory unit AM1 may be changed through its full range of five stable states and can be reversed as often as necessary by applying conditioning pulses to the appropriate line at the time that an input signal is present. Conditioning pulses are applied in common to all of the adaptive memory units in any one bank when adaptation is necessary via circuitry to be subsequently described. Only those adaptive memory units which are activated by inputs from the matrix expansion circuits will respond to such conditioning. It should be noted that the units which do not have an input signal from the matrix expansion circuits cannot change state at the time the conditioning pulses are applied nor do they effect the summation of weights on the summation output lines for their particular bank since the input lower level is below the lowest level that the collectors of the transistors in the adaptive memory unit can reach. Moreover, the units having zero weights; i.e., in their neutral state, cannot add to the net weight on the summation output lines in the presence of an input signal thereto because current flows equally into the summation output lines and, accordingly, the difference between the lines is not changed.

In order to determine the balance between the summation output lines from the individual banks of memory units, such as the balance between the lines 1W1 and 1W0, a plurality of balance decision units are provided, one for each bank of memory units. In the present instance, since there would be four banks of memory units, each associated with the binary orders 1, 2, 4, 8, in the output, there would be four balance decision units, only two of which are shown in the drawings; namely, BDU1 and BDU8. It will be understood that all of these units are similar and a detailed description of the balance decision unit BDU1 will suffice for all units in the system. The balance decision units examine the summation output lines from the memory units for balance or unbalance. When the memory is unconditioned so that all of the adaptive memory units are in their neutral state, the inputs to the decision unit will be alike and all patterns will give the intermediate or "don't know" response which could be considered a neutral state for the decision unit. The neutral state permits conditioning in either direction. After conditioning, the memory weights will sum up to give a learned response for particular input patterns and, in making a decision, no fixed threshold is used but a comparison is made between the zero and the one summation output line; the line with the highest or most positive voltage determining the output. This determination is made by the balance decision unit comprising a sensitive voltage discriminator device which includes a pair of emitter-coupled transistors X3 and X4 with a transistor X5 acting as a constant current source to increase the sensitivity of the arrangement.

First consider the case where no input pattern is present in the matrix so that the summation output voltages are the same. At this time transistors X6 and X7 which are connected in the collector circuits of X3 and X4 will conduct by virtue of the equal current distribution between the transistors X3 and X4. X5, acting as a constant current device, limits the current to a particular value, say for example, 3 milliamperes. This current divides equally between transistors X3 and X4 so that each conducts one half of the total; i.e., 1.5 milliamperes. With suitable circuit parameters then, a smaller current flows in the base circuits of the transistors X6 and X7 to bring these to saturation. Thus, in this present instance, an equality of the inputs to the decision unit is effective to energize both of the outputs. The outputs of the balance decision unit may be supplied to suitable output terminals such as 60 and 61, and the outputs may also be indicated by suitable output indicator lamps such as the lamps 1K0 and 1K1, shown in the drawings, both of which would be lighted at this time since transistors X6 and X7 are both conducting.

A relatively small difference in the potential between the two summation lines 1W1 and 1W0, such as 0.05 volt, will cause the current to be unequally distributed between the transistors X3 and X4. If under these circumstances the input voltage on 1W0 is greater or more positive than 1W1, transistor X3 will conduct almost all of the current which in turn will hold ON transistor X6; but transistor X7 will be turned OFF as the voltage at the base of this transistor rises towards +6 volts. Conversely, if the voltage on the summation output line 1W1 is more positive than that on 1W0, transistors X4 and X7 conduct to provide a "1" output and turn OFF the "0" output. The adjustable voltage divider 63 in the emitter circuit of transistor X5 provides an adjustment to regulate the voltage difference to which the balance detector unit will respond. Also, an adjustable resistor 65 is provided to center the null point within the insensitive zone. In a memory bank of 35 units, the minimum difference for one unit of weight may be arranged to be of some relatively low voltage such as 0.1 volt, for example, and the insensitive zone may be 0.5 volt on either side of the null point.

The conditioning of the adaptive memory unit is governed by signals supplied from the statistical conditioning circuit shown in FIGS. 3a and 3b and which will be subsequently described. For the present, suffice it to say that a conditioning gate control signal is supplied on a line CT0, each time that conditioning is to occur. This signal is supplied to a plurality of AND logic circuits associated with each memory bank. One such logic circuit is shown at 73 and constitutes a plurality of diodes connected to a load resistor and to a suitable source of energy in conventional fashion, so that inputs must be present at each of the three gating diodes in order to provide an output therefrom. The output from the AND circuit 73 is supplied to a conditioning driver indicated by the dotted rectangle 75 and comprising a pair of transistors X10 and X11, connected in such manner that an input pulse supplied from the AND circuit 73 will cause the conditioning driver to provide an output pulse on the conditioning line, such as 1C0, connected thereto. Sufficient power is provided by this driver to drive all of the adaptive memory units in the bank, in this particular instance 35. An R-C timing circuit from the collector of transistor X10 controls transistor X11 to the base of transistor X11 to the base of transistor X11 so that a pulse of constant width is produced that is independent of the duration of the input pulse from the AND circuit 73.

The training of this system is under the control of a plurality of training switches, one for each bank, which are designated in binary code fashion by the reference characters 1T, 2T, 4T and 8T. These switches, when closed, establish a circuit from −12 volts to ground through an associated indication lamp, such as lamps 1TK, 2TK, 4TK and 8TK. With the switch open, the training signal lines, such as 1TS, connected to the switch have a negative potential supplied thereto through the lamp. When the switch is closed, the lamp is lighted and the potential on the line goes to ground. This difference in potential is supplied directly to one of the AND circuits, such as 85, and is supplied to the other AND circuits, such as 73, via an inverter, such as 87. The inverter comprises a PNP transistor connected in such manner that the input and output signals are inverted. The remaining input to the AND circuits in the conditioning portion of the system, such as the AND circuits 73 and 85 for the first bank, are supplied from the outputs of the balance decision unit associated with that particular bank; for example, the output signal from BDU1 at terminal 60 is supplied to one of the inputs to AND circuit 85 and the output signal from BDU1 at terminal 61 is supplied to one of the inputs of AND circuit 73. It will be noted that the output from the balance decision unit indicating the "1" condition is fed back to the adaptive memory unit to influence the zero condition weighting while the output indicating the "0" condition for the balance decision unit 1 is fed back via AND circuit 85 and a conditioning driver 89 to the conditioning line 1C1 which weights the adaptive memory unit AM1 in a positive direction. Similar conditioning circuits with suitable inputs from the associated balance decision units and from the training switches are provided for each of the other banks in the system.

Reverse tare weight units, one for each memory bank, are constituted as shown in detail in FIG. 2b. The details of only one such unit RTW1 are shown, since all are similar. The unit comprises a pair of NPN transistors X13 and X14, having their collectors grounded through suitable load resistors and their emitters connected to −6 volts, as shown. The bases are grounded via resistors, such as R10 and R11, and inputs from a tare weight control line TWC and the training output and inverted training output lines from the first bank are supplied to the bases of X13 and X14 via diodes which function as AND inputs. The collectors of X13 and X14 are connected via suitable resistors to the adaptive memory output lines 1W0 and 1W1 respectively. In operation, assume first that the condition trigger output is OFF so that the potential on line TWC is approximately −12 volts. Transistors X13 and X14 will both be cut off, with the −12 volt potential applied to their bases via diodes D20 and D21. Their respective collectors will be near ground potential, and equal voltages or "weights" will be applied to lines 1W0 and 1W1 via resistors R12 and R13. Under these conditions, the applied voltages effectively cancel insofar as the balance detector unit is concerned, and the balance is undistorted.

During conditioning, line TWC rises to 0 volts, or ground potential, and either the desired output line 1TS or its inverse line, at the output of inverter 87 will be at 0 volts, depending upon whether switch 1T is closed or open. Consider the case wherein 1TS is at 0 volts. The inverted signal will then be at −12 volts, and, via diode D30, will hold transistor X13 cut off. Transistor X14 will conduct since both diodes D21 and D31 are reverse biased. Current then flows from ground through the resistor R11 to the base of X14, thence through the emitter of X14 to −6 volts. This saturates X14, with the collector at approximately −6 volts. Since the 1W1 line is also near −6 volts, the current in resistor R13 is reduced to practically zero. Because the current flowing to the 1W0 line has not changed, the net effect is to increase the weight tipping the balance to "zero." Thus, a desired output of "one" will produce a reverse tare weight for zero. It will be apparent that the action described is reversed for a desired output of "zero," which results in a reverse tare weight tending to tip the balance toward "one."

It should be noted that, in this embodiment, the reverse tare weight unit is rendered effective only during conditioning, under the control of a conditioning trigger via line TWC. At other times, the reverse tare weight unit has no effect on the balance of the adaptive memory outputs.

It can be shown that the use of the reverse tare weight unit provides an increased separation between the weights accumulated in opposite directions and provides for more rapid "learning."

In adapting a system to distinguish different combinations of inputs, a particular combination of inputs is entered into the memory by appropriately energizing selected elements of the input matrix which, via matrix expansion circuits, are entered into the adaptive memory with the desired output combination set up on the training switches. The conditioning key is then operated and those memory banks which indicate an output other than that desired are automatically conditioned by the signals supplied from the balance decision unit and the training switches via the AND circuits and conditioning drivers to shift the particular input-activated adaptive memory unit or units in the proper direction. A second set of inputs is then supplied to the input matrix and the process is repeated with the training switches being set to provide the selected output for the second set of inputs. After a first run of such training operations, it will be found necessary of course to return and recondition some of the adaptive memories, since they will shift back and forth during the memory process, and several runs through the learning process will be required before the system will adapt to a particular set of inputs with a particular set of outputs.

Referring now to FIGS. 3a and 3b, taken together, the circuits shown thereon constitute the statistical conditioning circuits which are utilized to provide the signals to the output of the matrix expansion circuits as shown in FIG. 2a, as well as the signals on the lines TWC in FIG. 2b and CT0 in FIG. 2c.

In general, the statistical conditioning circuits include a source of random signals such as a suitable noise source in the present instance provided with a particular automatic bias control, and suitable pulse shaping circuits which supply random input signals to a serial shift register. These signals are shifted into and through the shift register under the control of suitable synchronized drive signals supplied from a frequency source, such as a multivibrator together with appropriate shaping circuits, and are under the control of a key trigger which in turn is governed by the operation of a conditioning key. The outputs of the shift register stages are taken to current gate stages which, in combination with the suitably shaped signals derived from the key trigger operation, provide output signals which are effective to inhibit the outputs of the matrix expansion circuits, so that, during conditioning, only randomly selected ones of the various subgroups in the matrix expansion circuits will be effective. The circuitry also includes further pulse shaping circuits and suitable power driving circuits to provide output signals which are effective to operate the conditioning driver circuits associated with the adaptive memory units and also signals which are effective to govern the tare weight units.

A noise source includes a Zener diode 90 connected in the collector-to-a base circuit of PNP transistor X15, the diode being biased to its threshold points so that it functions as a source of random noise. This noise is amplified by the circuits including the transistors X15, X16 and X17, to provide a source of noise signals of relatively high amplitude and of random character. The pulses are integrated and shaped in the integrating pulse shaper including NPN transistor X18 and PNP transistors X19 and X20, the input to the integrating pulse shaper including an adjustable resistor 91 which governs the width of the integrated pulses. The output from the integrating pulse shaper is supplied to the input of a conventional inverter stage including transistor X21 and is also fed back to an automatic bias control circuit, including the transistors X23, X24 and X25, in which the integrated pulses are further integrated and the output therefrom at the collector of transistor X25 is supplied back to the amplifiers in the noise source as a varying D.C. voltage so as to maintain a constant ratio between the "ones" and the "zeros" or the pulse-no pulse outputs. The integration assures that this ratio is maintained over a relatively long averaging period while allowing full freedom for pulse width variation and position on a short time basis. The output of the inverter transistor X21 is supplied to the input of the first stage SR1 of a shift register having as many stages as their are groups of matrix expansion circuits; for example, in the present instance, five stages. Each stage of the shift register has it output connected in cascade to the input of the following stage so that the random input signal pulses supplied to the input of the first stage are shifted in sequence through the five stages of the shift register. It will be apparent therefore that, at any given time, the shift register will contain a random binary number indicated by the presence or absence of a stored bit in a particular stage. All of these stages of the shift register are constructed similar to the detailed arrangement in the stage SR1 and comprise a pair of NPN transistors X27 and X28, the collectors of which are cross-coupled to the bases of the other transistor, and having an input supplied to the base of the transistor on one side, such as X27, and the output of that stage coupled to the base of the other portion of the stage including transistor X28, and to the output of the stage SR1. Each of the stages is provided with synchronized shift pulses supplied thereto over a pair of common synchronized drive pulse lines designated by reference characters SY1 and SY2. The synchronizing pulses on these lines are supplied to the shift register stage via a pair of diodes such as D32 and D33. These signals, as well as the input signals, are supplied to the transistors in the shift register stage via a suitable coupling capacitor. One side of the shift register stage is connected as an output to an associated current gate, such as the gates CG1 through CG5, CG1 and CG5 being shown in detail and the others being arranged in similar manner. All of the current gates include a pair of diodes functioning as an AND circuit, one diode in each case being coupled to a common control line CGC, the other diode being coupled to the output of the associated shift register stage, as indicated for the connections between shift register stage SR1 and current gate 1. The outputs taken from the PNP transistors in each of the current gates are supplied to the appropriate ones of the emitter followers in the matrix expansion circuits via the lines SC1 through SC5. Accordingly, it is apparent that, when the common control line for the current gates has an appropriate signal supplied thereto, each of the current gates will or will not supply an output signal in accordance with whether or not the associated shift register stage contains a bit. The information in the shift register stages, the random number, is frozen during the conditioning interval; and, since the bit pattern is continually changing under the control of the random signal source previously described, it is apparent that the matrix expansion circuits will be enabled on a strictly statistical or random basis. That is to say, it will not be possible to predict how many or which groups of inputs will be activated for a particular conditioning cycle—yet, on the average, all groups will be conditioned in an equivalent manner.

The pulses for synchronously moving bits through the stages of the shift register are supplied thereto on the lines SY1 and SY2, these lies being commoned to each of the stages SR1 through SR5. The shift register synchronizing pulses supplied on these lines are generated by a constant duty cycle multivibrator comprising the transistors X29 and X30, which have their collectors and bases crosscoupled in the usual multivibrator configuration and having an adjustable resistor 92 and a capacitor connected between the base resistors and the variable voltage source which may range from —12 volts to ground, to provide a frequency control. The differentiated output pulses from the multivibrator are supplied through a PNP transistor X35, the collector and the emitter of this transistor X32 and X33, from whence they are supplied to the input of an inverter including transistor X34. The output at the collector of transistor X34 is supplied through one diode D37 of an AND circuit to the base of transistor X35, the collector and the emitter of this transistor being connected to the lines SY1 and SY2, respectively, with suitable diode clamps to ground. The output at the collector of transistor X35 consists of negative-going pulses from a potential of +6 volts to 0 volts and the output at the emitter of this transistor are positive-going pulses from —6 volts to 0 volts, occurring in exact synchronism with the negative-going pulses at the collector. As previously described, these pulses are utilized for shifting the information through the shift register stages. However, it should be noted that the pulses are only effective during the time that the AND gate in the input to the transistor X35 is enabled, by suitable biasing of a diode D38, which will be subsequently described.

The primary control device for instituting the conditioning operation is the conditioning key CK, which is a spring-loaded key that, in its normal condition, causes a conditioning trigger comprising the two transistors X37 and X38 to assume one of its two stable states. When the conditioning key is operated, the trigger is switched to its other state and provides an output pulse, returning to its initial state when the key is released. The conditioning key trigger is conventional in construction, constituting a pair of NPN transistors X37 and X38 which are emitter-coupled and which have the biases changed thereon in accordance with the operation of the conditioning key CK. Suitable cross-coupling circuits are provided to insure that the one half of the trigger is turned off while the other is turned on, and so forth. The output from the conditioning trigger is supplied to the line TWC, which, as shown on FIG. 2b, is utilized to govern the inputs to the reverse tare weight control units. Also, the output of the conditioning trigger is supplied to a low frequency gated multivibrator including the transistors X39 and X40, which is constructed and arranged so that, upon a supply thereto of a signal from the conditioning key trigger, the gated multivibrator will provide output pulses at a specified relatively low rate; for example, ten pulses per second. The output of the gated multivibrator is supplied to a pulse shaping circuit including the inverter transistor X41 and an emitter follower including transistor X42, from whence it is supplied to the diode D38, which acts as the gating control for the synchronizing pulses, and also to a positive transient pulse generator via a coupling capacitor Q5, the positive transient pulse generator including the transistors X43 and X44, the base biasing circuit for transistor X44 including a variable resistor 95 for the purpose of adjusting the width of the positive transient pulse provided at a collector of transistor X44. This positive transient pulse rises from a level of approximately —6 volts to +6 volts and has a duration determined by the adjustment of the adjustable resistor 95. This pulse is supplied to the common gate control line CGC for the purpose of de-energizing the current gates during the conditioning operation to determine which of the matrix expansion circuits will be rendered ineffective. This positive-going pulse, when combined with a positive input from the shift registers, will cause the AND circuit in the appropriate current gate to pass a signal which will render the output from the current gate ineffective for maintaining the associated matrix expansion emitter followers in a conductive state. The pulse is also supplied to the input of a negative transient pulse generator via the capacitor Q7, the negative transient pulse generator including transistors X46 and X47. Variable resistor 97 permits adjustment of the width of the negative-going transient pulse produced by this circuit. The negative pulse output of this circuit is supplied to a push-pull inverter driver comprising transistors X49 and X50, the positive pulse output taken from the emitter of transistor X50 being supplied to the line CTO, which, shown in FIG. 2c, is connected via the associated AND circuits to the conditioning drivers for the memory banks.

In operation, the gated multivibrator, turned on by the condition key trigger, clamps the sync drive and causes the signals in the shift register to stop shifting for the duration of the gated multivibrator positive level output. Then a suitable short pulse is supplied to the line CGC as a result of the operation of the positive transient pulse generator so that the current gates associated with the shift register stages containing zeros therein will provide an output which cuts off the associated emitter followers in the matrix expansion. As a result, the memory units associated with these particular emitter followers in the matrix expansion will have a negative-going pulse at their conditioning gates and will thus fail to respond to the conditioning pulse that follows immediately thereafter as a result of the operation of the negative transient generator. The negative pulse at the conditioning gates is sufficiently short in duration that the balance detectors associated with the memory banks are not affected and, upon restoration of the current through the current gates, all of the inputs at the output of the matrix expansion circuits are effective to determine the corrected balance after conditioning has taken place.

If the first conditioning cycle does not provide enough change in the weights from the adaptive memory to produce the desired output at the balance detector units, the gated multivibrator provides a negative level at its output to release the clamp provided by diode D38 upon the sync drive. Random numbers now stream through the shift register until the gated multivibrator stops the shift register by restoring the clamp through D38. The positive transient generator then cuts off current gates as determined by this new number and a second conditioning pulse is produced on line CT0. Thus, conditioning pulses are supplied in conjunction with a random selection of inputs until the desired outputs are produced. At this time all conditioning ceases, even though pulses will be produced on line CT0 as long as the conditioning key, CK, is operated. When the key is released, the line TWC cuts off the reverse tare units and stops the gated multivibrator. Random numbers are continuously generated between conditioning cycles and flow through the shift register until a new conditioning cycle begins.

It should be noted that the invention is not restricted to the use of the detailed circuit arrangements shown in FIGS. 3a and 3b, this being one example only of a type of circuit arrangement which may be employed. Suffice it to say that any system arranged to provide a random switching of the outputs of the matrix expansion circuits during a conditioning cycle may be employed within the spirit and scope of this invention.

From the foregoing, it will be apparent that the present invention provides an improved adaptive logic system in which inputs to the adaptive memory units are supplied on a random basis during conditioning.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An adaptive logic system comprising, in combination,
   (a) a plurality of adaptive memory units, each unit having a plurality of stable conditions to which the unit may be set in response to input and conditioning signals supplied thereto,
   (b) a source of input signals connected to said memory units,
   (c) a source of conditioning signals connected to said memory units,
   (d) a common output circuit connected to said memory units and having output signals thereon of different weights in accordance with the states of the memory units, and
   (e) means for inhibiting the input signals to said memory units on a random selection basis only during the conditioning of said system.

2. An adaptive logic system comprising, in combination,
   (a) an input matrix having a plurality of input elements, said matrix being divided into a plurality of sub-spaces, each having a plurality of said elements therein;
   (b) combinatorial means, one for each of said sub-spaces, for combining the signals from the input elements in said sub-spaces to furnish a plurality of transformed output signals;
   (c) a plurality of metastable adaptive memory units, one for each output combination, connected to said combinatorial means to receive the transformed outputs therefrom;
   (d) conditioning means connected to said memory units to condition the units to predetermined conditions in accordance with the input signals supplied to said units and in accordance with desired outputs;
   (e) output means for indicating the state of said adaptive memory units and controlling said conditioning means, and
   (f) switching means governed by said conditioning means for randomly selecting and rendering effective the connections of the outputs of said combinatorial means to the inputs of said memory units only during the conditioning operation.

3. An adaptive logic system comprising, in combination,
   (a) an input matrix having a plurality of input elements arranged in rectangular form, said matrix being divided into a plurality of sub-spaces along a selected coordinate of said matrix;
   (b) combinatorial means, one for each of said sub-spaces, for combining the signals from the input elements in said sub-spaces to furnish a plurality of transformed output signals;
   (c) a plurality of metastable adaptive memory units, one for each output combination, connected to said combinatorial means to receive the transformed outputs therefrom;
   (d) conditioning means connected to said memory units to condition the units to predetermined conditions in accordance with the input signals supplied to said units and in accordance with desired outputs;
   (e) output means for indicating the state of said adaptive memory units and controlling said conditioning means; and
   (f) switching means governed by said conditioning means for randomly selecting and rendering effective the connections of the outputs of said combinatorial means to the inputs of said memory units when and only when the system is being conditioned.

4. An adaptive logic system comprising, in combination,
   (a) a plurality of metastable memory units having a plurality of stable conditions on each side of a neutral condition, each said memory unit having two output signals on said circuits, the output signals on said circuits being balanced when said memory unit is in its neutral condition and unbalanced in one direction or the other when said unit is displaced to one side or the other of said neutral condition;

(b) input means connected to said memory units for setting said units in selected conditions;

(c) a pair of memory output signal lines connected to the output circuits of all of said memory units;

(d) balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

(e) conditioning means for controlling the conditioning of said memory units to selected conditions in response to input signals, said conditioning means being controlled by said balance detection means to condition said memory units in a direction to displace said units from the condition indicated by said balance detection means;

(f) means for indicating the first, second and third outputs from said balance detecting means; and (g) means connected to said input means for selecting and rendering said input means effective on a random basis when and only when said conditioning means is effective.

5. An adaptive logic system comprising, in combination, (a) a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

(b) input means connected to said memory units for setting said units in selected conditions;

(c) a pair of memory output signal lines connected to the output circuits of all of said memory units;

(d) balance detection means connected to said output signal lines and responsive to signals on said lines to provide a first output when the signals on said memory output lines are equal, a second output when the signals on said memory output lines are unbalanced in a first relation and a third output when the signals on said memory output lines are unbalanced in a second relation;

(e) conditioning means for controlling the conditioning of said memory units to selected conditions in response to input signals, said conditioning means being controlled by said balance detection means to condition said memory units in a direction to displace said units from the condition indicated by said balance detection means; and (f) random switching means governed by said conditioning means for selecting and rendering said input means effective on a random basis only during the conditioning of said system.

6. A random input selection means for an adaptive logic system, said system having a plurality of inputs, comprising, in combination, (a) a random signal generator for producing pulse trains with randomly appearing signals, (b) a serial shift register connected to said signal generator for receiving said pulse trains and shifting the pulse trains therethrough, (c) control means for temporarily inhibiting the shifting of the pulse trains through said shift register, and (d) switching means connected to the inputs of said adaptive logic system and controlled by selected stages of said shift register to render the inputs effective in accordance with the presence of random signals in said shift register.

7. A random input selection means for an adaptive logic system as claimed in claim 6, in which said random signal generator comprises a noise source and pulse shaping means for deriving random signals from said noise source.

8. A random input selection means for an adaptive logic system as claimed in claim 7, including an automatic bias control for said noise source governed by the output from said pulse shaping means.

References Cited by the Examiner

UNITED STATES PATENTS

| | | | |
|---|---|---|---|
| 3,022,005 | 2/1962 | Dickinson | 235—152 |
| 3,106,699 | 10/1963 | Kamentsky | 340—172.5 |
| 3,158,840 | 11/1964 | Baskin | 340—172.5 |
| 3,209,328 | 9/1965 | Bonner | 340—172.5 |

OTHER REFERENCES

Pages 30–33, Sept. 13, 1961, Corneretto, A. Bionics Efforts Center on Learning Machines. In Electronic Design.

Pages 49–53, Mar. 22, 1963—Crafts, H. S. Components That Learn and How to Use Them. In electronics.

ROBERT C. BAILEY, *Primary Examiner.*

J. P. VANDENBURG, *Assistant Examiner.*